(12) United States Patent
Badino et al.

(10) Patent No.: US 10,495,882 B1
(45) Date of Patent: Dec. 3, 2019

(54) POSITIONING CAMERAS IN A HEAD MOUNTED DISPLAY TO CAPTURE IMAGES OF PORTIONS OF A FACE OF A USER

(71) Applicant: Facebook Technologies, LLC, Menlo Park, CA (US)

(72) Inventors: Hernan Badino, Pittsburgh, PA (US); Yaser Sheikh, Pittsburgh, PA (US); Alexander Trenor Hypes, Pittsburgh, PA (US); Dawei Wang, Pittsburgh, PA (US); Mohsen Shahmohammadi, Pittsburgh, PA (US); Michal Perdoch, Pittsburgh, PA (US); Jason Saragih, Pittsburgh, PA (US); Shih-En Wei, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 45 days.

(21) Appl. No.: 15/997,655

(22) Filed: Jun. 4, 2018

(51) Int. Cl.
*G09G 5/00* (2006.01)
*G02B 27/01* (2006.01)
*G06T 7/73* (2017.01)
*G06F 3/01* (2006.01)
*G06T 19/00* (2011.01)

(52) U.S. Cl.
CPC ......... *G02B 27/0172* (2013.01); *G06F 3/012* (2013.01); *G06T 7/75* (2017.01); *G02B 2027/0138* (2013.01); *G06T 19/006* (2013.01)

(58) Field of Classification Search
CPC .............. G02B 27/0172; G02B 27/017; G02B 2027/0138; G06T 7/75; G06T 19/006; G06F 3/012; G06F 3/013
See application file for complete search history.

(56) References Cited

U.S. PATENT DOCUMENTS

| | | | |
|---|---|---|---|
| 2017/0122725 A1* | 5/2017 | Yeoh | G02B 27/01 |
| 2018/0004478 A1* | 1/2018 | Chen | G06F 3/1454 |
| 2018/0027158 A1* | 1/2018 | Tzvieli | A61B 5/0075 348/77 |

* cited by examiner

*Primary Examiner* — Adam R. Giesy
(74) *Attorney, Agent, or Firm* — Fenwick & West LLP (57) ABSTRACT

A virtual reality (VR) or augmented reality (AR) head mounted display (HMD) includes multiple image capture devices positioned within and on the HMD to capture portions of a face of a user wearing the HMD. Multiple image capture devices are included within the HMD to capture different portions of the face of the user within the HMD, and one or more other image capture devices are positioned to capture portions of the face of the user external to the HMD. Captured images from various image capture devices may be communicated to a console or a controller that generates a graphical representation of the user's face based on the captured images.

20 Claims, 6 Drawing Sheets

POSITIONING CAMERAS IN A HEAD MOUNTED DISPLAY TO CAPTURE IMAGES OF PORTIONS OF A FACE OF A USER

BACKGROUND

The present disclosure generally relates to head mounted displays, and more specifically relates to positioning image capture devices within a head mounted display to capture images of portions of the user's face.

Virtual reality systems typically include a display presenting content to users. For example, many virtual reality, or augmented reality, systems include a head-mounted display including a display element presenting image or video data to a user. Content presented by the virtual reality system depicts objects and users of the system.

Many virtual reality systems present graphical representations, or avatars, of users in a virtual environment to facilitate interactions between users. However, conventional virtual reality systems provide limited graphical representations of a user. For example, avatars representing users in many conventional virtual reality systems have a single facial expression, such as a default smiling or neutral facial expression, or a limited set of facial expressions. These limited facial expressions shown by avatars in virtual reality systems often present users from having a fully immersive experience in a virtual environment. Similarly, avatars used by conventional virtual reality systems provide limited details regarding movement of a user's body. For example, avatars are limited to performing a limited number of bodily movements that are performed via predetermined instructions describing movement.

Tracking a user's face and body while the user interacts with a virtual reality system or an augmented reality system may provide a more immersive interface by allowing content presented by the virtual reality system or augmented reality system to replicate movement of the user's face or body, providing a more immersive experience for the user. However, conventional facial or body tracking systems typically include a dedicated peripheral, such as a camera, as well as markers positioned on the face and body of a user being tracked. Using markers and the additional peripheral may separate users from a provided virtual environment and are ill-suited for use in a portable, lightweight, and high-performance virtual reality headset.

SUMMARY

A virtual reality (VR) or augmented reality (AR) head mounted display (HMD) includes multiple image capture devices having complementary fields of view and different depths. One or more of the image capture devices are positioned to capture images of a portion of a user's face external to a bottom side of the HMD. Additionally, one or more additional image capture devices are positioned to capture images of other portions of the user's face within the HMD. In various embodiments, a left image capture device is positioned within the HMD and proximate to a left side of the HMD and captures images of a portions of the user's face. A right image capture device is also positioned within the HMD and proximate to a right side of the HMD and captures portions of an additional portion of the user's face. Additionally, a central image capture device is positioned between exit pupils of the HMD that correspond to locations where the user's eyes are positioned and captures images of a central portion of the user's face. Hence, the left image capture device, the right image capture device, and the central image capture device each capture images of portions of the user's face that are enclosed by the HMD.

The image capture devices and the additional image capture device are coupled to a controller that receives images captured by the image capture devices and captured by the additional image capture devices. Images received from the image capture devices are analyzed to identify points of portions of the user's face included in the captured images, while images received from the additional image capture devices are analyzed to identify points of portions of the user's face included in additional images captured by the additional image capture devices. For example, the image capture devices capture images of portions of the user's face below a bottom surface of the HMD that include the user's mouth, so the controller analyzes images from the image capture devices to identify points along an outline of the user's mouth. Similarly, additional image captured by the additional image capture devices include portions of the user's face enclosed by a rigid body of the HMD, so the controller analyzes images from the additional image capture devices to identify points along an outline or within the user's eyes.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
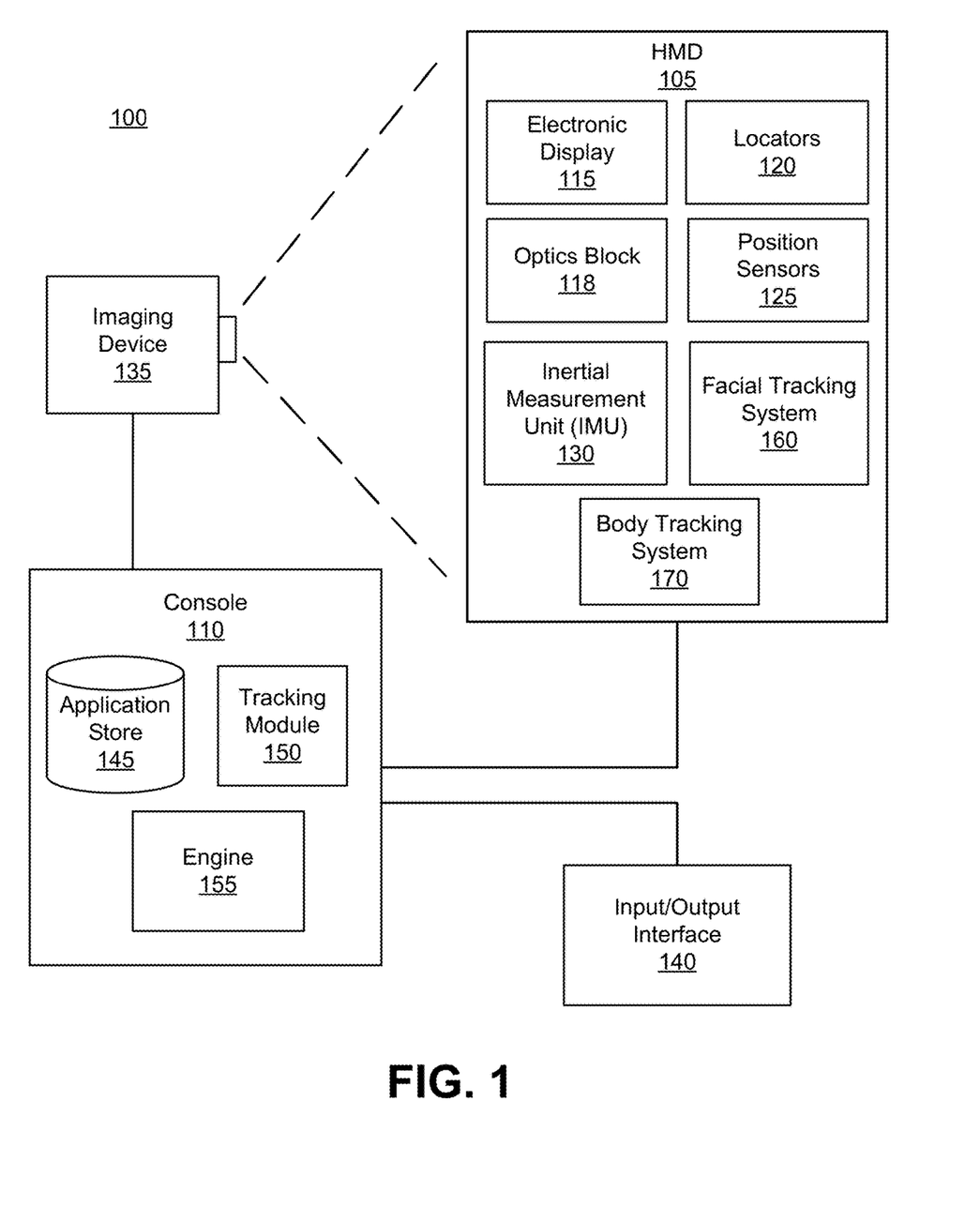
FIG. 1 is a block diagram of a virtual reality or an augmented reality system environment, in accordance with an embodiment.

FIG. 1 is a block diagram of a system environment 100 for providing virtual reality (VR) content or augmented reality (AR) content in accordance with an embodiment. The system environment 100 shown by FIG. 1 comprises a head mounted display (HMD) 105, an imaging device 135, and an input/output (I/O) interface 140 that are each coupled to a console 110. While FIG. 1 shows an example system environment 100 including one HMD 105, one imaging device 135, and one I/O interface 140, in other embodiments, any number of these components are included in the system environment 100. For example, an embodiment includes multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system environment 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. An embodiment of the HMD 105 is further described below in conjunction with FIGS. 3 and 4. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification and focusing of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The HMD 105 may include various locators 120 in some embodiments. The locators 120 are objects located in specific positions on the HMD 105 relative to one another and relative to a specific reference point on the HMD 105. For example, a locator 120 is a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration data. The reference point is a point describing the position of the HMD 105. While the reference point may generally be defined as a point in space, in practice, the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The facial tracking system 160 generates reconstructions of portions of a face of a user wearing the HMD 105, as further described below in conjunction with FIGS. 2-5. In an embodiment, the facial tracking system 160 includes image capture devices, additional image capture devices, and a controller, as further described below in conjunction with FIG. 2. The facial tracking system 160 includes any suitable number of image capture devices or additional image capture devices in various implementations. In some embodiments, the facial tracking system 160 also includes one or more illumination sources configured to illuminate portions of the user's face within fields of view of the one or more of the image capture devices or of the additional image capture devices. Based on images received from the image capture devices and from the additional image capture devices, the controller generates a trained model that maps positions of points identified within images captured by the image capture devices and by the additional image capture devices to a set of animation parameters that map the positions of the identified points to a three dimensional model of a face presented via a virtual reality environment of the HMD 105, as further described below in conjunction with FIG. 6.

The body tracking system 170 generates reconstructions of portions of a body of the user wearing the HMD 105. In an embodiment, the body tracking system 170 includes imaging devices configured to capture images of portions of the user's body outside of the HMD 105. For example, each imaging device is a camera having a field of view sufficient to capture one or more portions of the user's body outside of the HMD 105. As an example, the body tracking system 170 comprises multiple video cameras positioned along a bottom surface of the HMD 105 that are each configured to capture images including one or more portions of the user's body (e.g., arms, legs, hands, etc.). In some embodiments, the body tracking system 170 also includes one or more illumination sources configured to illuminate portions of the user's body within fields of view of the one or more of the imaging devices. The imaging devices are coupled to the controller of the facial tracking system, which generates a trained model that maps positions of points identified within images captured by the imaging devices to a set of body animation parameters based on images received from the imaging devices. The body animation parameters map positions of points of the user's body identified from the images to a three dimensional model of a body presented via a virtual reality environment of the HMD 105.

The imaging device 135 generates slow calibration data in accordance with calibration parameters received from the console 110. Slow calibration data includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The input/output (I/O) interface 140 is a device that allows a user to send action requests to the console 110 and to receive responses from the console 110. An action request is a request to perform a particular action. For example, an action request may be to start or end an application or to perform a particular action within the application. The I/O interface 140 may include one or more input devices. Example input devices include: a keyboard, a mouse, a game controller, or any other suitable device for receiving action requests and communicating the received action requests to the console 110. An action request received by the I/O interface 140 is communicated to the console 110, which performs an action corresponding to the action request. In some embodiments, the I/O interface 140 may provide haptic feedback to the user in accordance with instructions received from the console 110. For example, haptic feedback is provided when an action request is received or when the console 110 communicates instructions to the I/O interface 140 causing the I/O interface 140 to generate haptic feedback when the console 110 performs an action.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a tracking module 150, and a virtual reality (VR) engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the HMD 105. For example, the tracking module 150 adjusts the focus of the imaging device 135 to obtain a more accurate position for observed locators 120 on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some of or the entire system environment 100.

The tracking module 150 tracks movements of the HMD 105 using slow calibration information from the imaging device 135. The tracking module 150 determines positions of a reference point of the HMD 105 using observed locators 120 on the HMD 105 from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the engine 155.

The engine 155 executes applications within the system environment 100 and receives position information, acceleration information, velocity information, predicted future positions, or some combination thereof of the HMD 105 from the tracking module 150. Based on the received information, the engine 155 determines content to provide to the HMD 105 for presentation to a user. For example, if the received information indicates that the user has looked to the left, the engine 155 generates content for the HMD 105 that mirrors the user's movement in a virtual environment. Additionally, the VR engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Facial Tracking System

Figure 2:
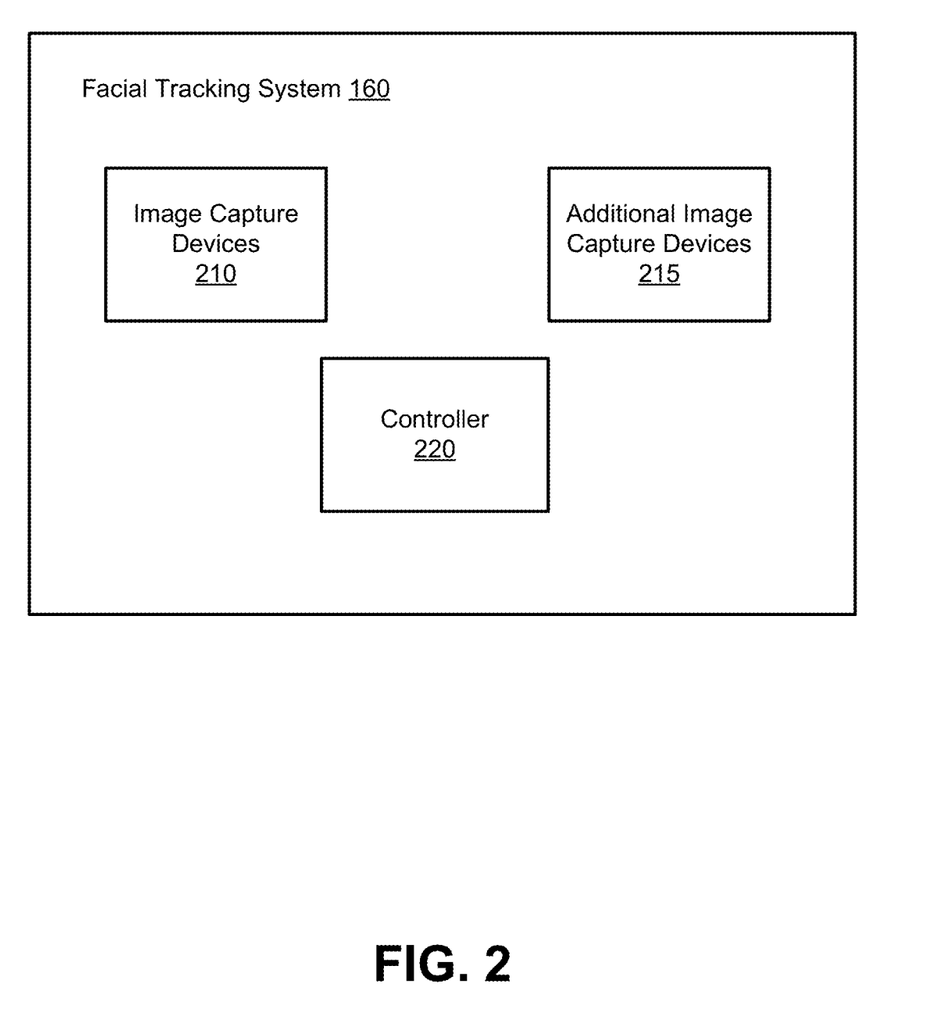
FIG. 2 is a block diagram of a facial tracking system of the virtual reality or the augmented reality system, in accordance with an embodiment.

FIG. 2 is a block diagram of one embodiment of a facial tracking system 160 of the system environment 100 for VR or AR. In the example shown in FIG. 2, the facial tracking system 160 includes one or more image capture devices 210, one or more additional image capture devices 215, and a controller 220. In other embodiments, different and/or additional components may be included in the facial tracking system 160.

Figure 4:
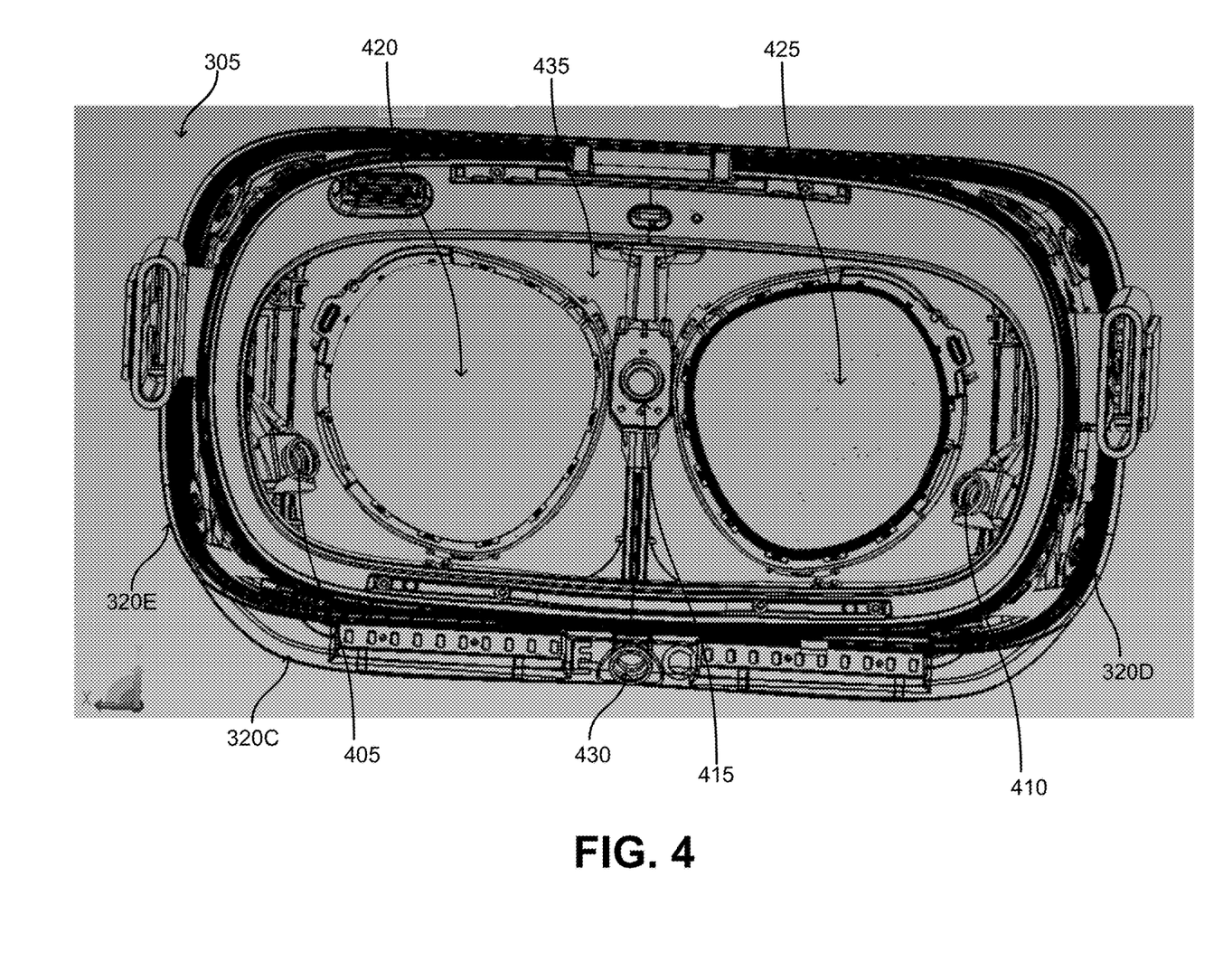
FIG. 4 is a rear view of the front rigid body 305 of the HMD 300 shown in FIG. 3, in accordance with an embodiment.

The image capture devices 210 capture images of portions of a face of a user of the HMD 105, while the additional image capture devices 215 capture additional images of other portions of the face of the user of the HMD 105. In various embodiments, the image capture devices 210 are positioned so each image capture device 210 has a different field of view and a different depth, so different image capture devices 210 capture images of different portions of the user's face. Different image capture devices 210 have known positions relative to each other and are positioned to have complementary fields of view including different portions of the user's face. Similarly, the additional image capture devices 215 are positioned so each additional image capture device 215 has a different field of view and a different depth, so different additional image capture devices 215 capture different images of different portions of the user's face. Additionally, different additional image capture devices 215 have known positions relative to each other and are positioned to have fields of view including different portions of the user's face. The image capture devices 210 and the additional image capture devices 215 are positioned relative to each other to capture different portions of the user's face. For example, the image capture devices 210 are positioned to capture portions of the user's face that are outside of the HMD 105, such as lower portions of the user's face below a bottom surface of the HMD 105, while the additional image capture devices 210 are positioned to capture additional portions of the user's face that are enclosed by the HMD 105. FIG. 4 shows an example positioning of the image capture devices 210 and the additional image capture devices 215.

Image capture devices 210 and additional image capture devices 215 may capture images based on light having different wavelengths reflected by the portions of the user's face. For example, image capture devices 210 and additional image capture devices 215 capture infrared light reflected by portions of the user's face. In another example image capture devices 210 and additional image capture devices 215 capture visible light reflected by portions of the user's face. Image capture devices 210 and additional image capture devices 215 have various parameters such as focal length, focus, frame rate, ISO, sensor temperature, shutter speed, aperture, resolution, etc. In some embodiments, the image capture devices 210 and the additional image capture devices 215 have a high frame rate and high resolution. The image capture devices 210 and the additional image capture devices 215 can capture two-dimensional images or three-dimensional images in various embodiments.

In some embodiments, one or more illumination sources are coupled to one or more surfaces of the HMD 105 and are positioned to illuminate portions of the user's face. Illumination sources may be positioned at discrete locations along the HMD 105. In some embodiments, the one or more illumination sources are coupled to one or more exterior surfaces of the HMD 105. Additionally, one or more illumination sources may be positioned within a rigid body of the HMD 105 to illuminate portions of the user's face enclosed by the rigid body of the HMD 105. Example illumination sources include be light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources have different characteristics. As an example, different illumination sources emit light having different wavelengths or different temporal coherences describing correlation between light waves at different points in time. Further, light emitted by different illumination sources may be modulated at different frequencies or amplitudes (i.e., varying intensity) or multiplexed in a time domain or in a frequency domain.

The controller 220 is coupled to the image capture devices 210 and to the additional image capture devices 215 and communicates instructions to the image capture devices 210 and to the additional image capture devices 215. Instructions from the controller 220 to an image capture device 210 or to an additional image capture device 215 cause the image capture device 210 or the additional image capture device 215 to capture one or more images of portions of the user's face within the field of view of the image capture device 210 or of the additional image capture device 215. In an embodiment, the controller 220 stores captured data describing characteristics of portions of the user's face (e.g., images of portions of the user's face) in a storage device accessible by the controller 220. As further described below in conjunction with FIG. 6, the controller includes a trained model that maps positions of points identified within images captured by various image capture devices 210 or additional image capture devices 215 to a set of animation parameters that map points of the user's face included in images captured by the image capture devices 210 or by the additional image capture devices 215 to a three dimensional (3D) model of a face that is presented in a virtual reality environment or in an augmented reality environment to present a graphical representation of the user's face replicating the user's facial expression or facial movement captured by the image capture devices 210 or by the additional image capture devices 215.

In some embodiments, the controller 220 communicates the set of animation parameters to the console 110, which may store the facial animation model in association with information identifying the user. The console 110 may communicate the set of animation parameters and information associated with the user to one or more other consoles 110, allowing HMDs 105 coupled to the other consoles 110 to present graphical representations of the user's face reflecting facial expressions or facial movements of the user captured by the image capture devices 210 and by the additional image capture devices 215. In some embodiments, the console 110 may communicate the set of animation parameters to a server that stores animation parameters in association with information identifying different users. Additionally, the console 110 may modify content provided to the HMD 105 for presentation based on the set of animation parameters and other information received from the controller 220, such as positions of points identified within images captured from one or more image capture devices 210 or additional image capture devices 215 and provided to the controller 220. For example, the console 110 generates a graphical representation of the user's face that renders movement of the portions of the user's face on a three-dimensional model based on the set of animation parameters and positions of points identified within captured images of portions of the user's face; this allows the graphical representation of the user's face to replicate expressions and movement of portions of the user's face captured by one or more of the image capture devices 210 or by one or more of the additional image capture devices 210.

Head Mounted Display

Figure 3:
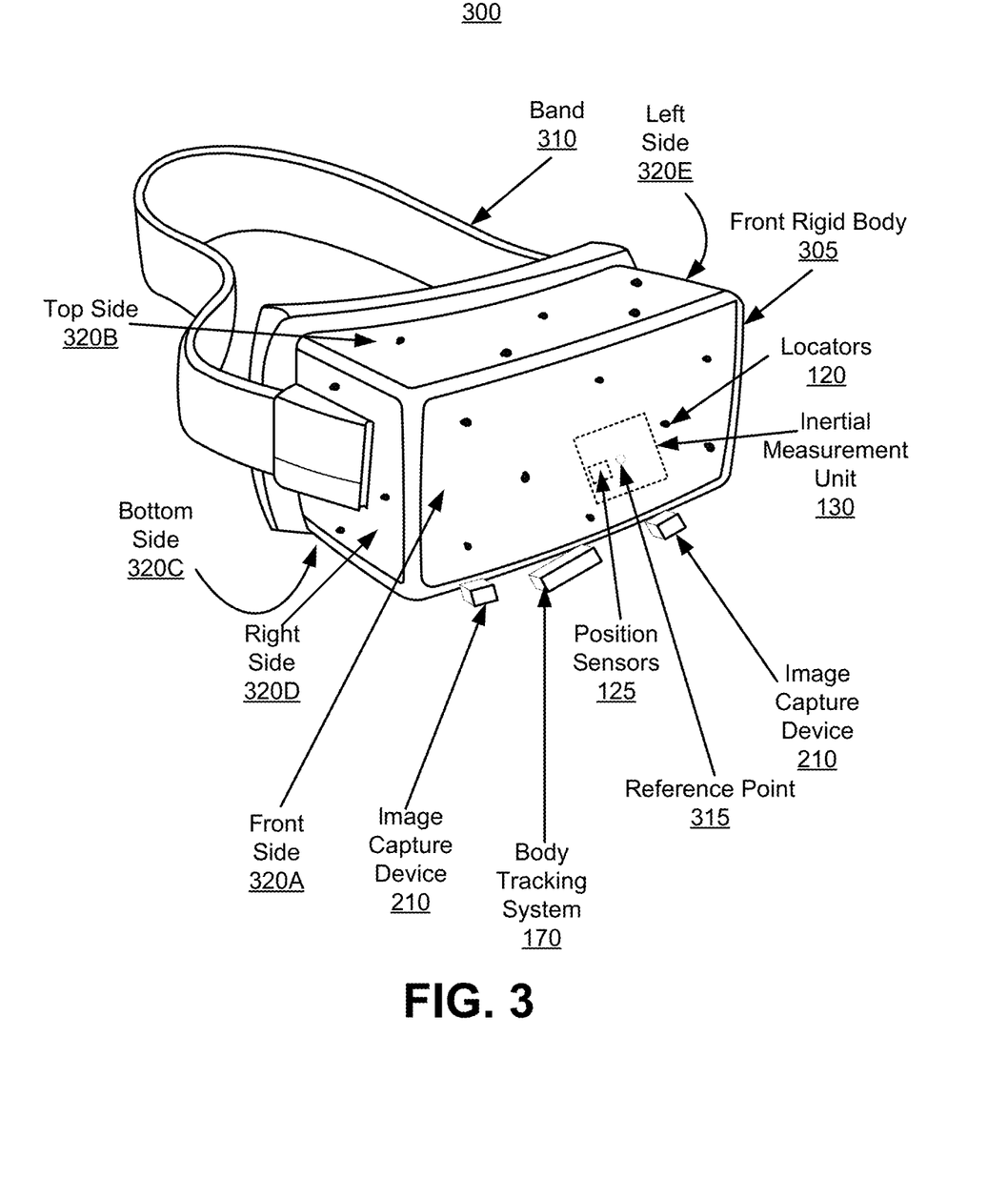
FIG. 3 is a wire diagram of a head mounted display, in accordance with an embodiment.

FIG. 3 is a wire diagram of one embodiment of a HMD 300. The HMD 300 shown in FIG. 3 is an embodiment of the HMD 105 that includes a front rigid body 305 and a band 310. The front rigid body 305 includes the electronic display 115 (not shown in FIG. 3), the IMU 130, the one or more position sensors 125, and the locators 120. In the embodiment shown by FIG. 3, the position sensors 125 are located within the IMU 130, and neither the IMU 130 nor the position sensors 125 are visible to the user.

The locators 120 are located in fixed positions on the front rigid body 305 relative to one another and relative to a reference point 315. In the example of FIG. 3, the reference point 315 is located at the center of the IMU 130. Each of the locators 120 emit light that is detectable by the imaging device 135. Locators 120, or portions of locators 120, are located on a front side 320A, a top side 320B, a bottom side 320C, a right side 320D, and a left side 320E of the front rigid body 305 in the example shown in FIG. 3.

In the example of FIG. 3, the HMD 300 includes image capture devices 210 coupled to the bottom side 320A of the HMD 300. For example, an image capture device 210 is coupled to the bottom side 320C of the HMD 300 proximate to the right side 320D of the HMD 300, and another image capture device 210 is coupled to the bottom side 320C of the HMD 300 proximate to the left side 320E of the HMD 300. The image capture devices 210 capture images of portions of the user's face below the bottom side 320C of the HMD 300. In the example of FIG. 3, the image capture device 210 captures images of portions of the user's face proximate to the right side 320D of the HMD 300, while the other image capture device 210 captures images of portions of the user's face proximate to the left side 320E of the HMD 300. While FIG. 3 shows an embodiment with two image capture devices 210, any number of image capture devices 210 may be included in various embodiments. The image capture devices 210 have specific positions relative to each other. Additionally, in various embodiments, different image capture devices 210 have non-overlapping fields of view.

Similarly, a body tracking system 170 including multiple imaging devices is coupled to the bottom side 320C of the HMD 300 in FIG. 3. Each imaging device of the body tracking system 170 is configured to capture images of portions of the user's body below the HMD 300 and external to the HMD 300. In various embodiments, different imaging devices of the body tracking system 170 have non-overlapping fields of view.

FIG. 4 is a rear view of the front rigid body 305 of the HMD 300 shown in FIG. 3. In the embodiment shown in FIG. 4, the front rigid body 305 includes an eyecup assembly 435 including an exit pupil 420 and an additional exit pupil 425. The exit pupil 420 is a position where an eye of a user is positioned when the user is wearing the HMD 300, while the additional exit pupil is a position where another eye of the user is positioned when the user is wearing the HMD 300.

In the example of FIG. 4, a left image capture device 405 is coupled to an interior surface of the left side 320E of the front rigid body 305 of the HMD 300 and is proximate to a bottom side 320C of the front rigid body 305 of the HMD 300. The left image capture device 405 captures images of a portion of the user's face. In the example of FIG. 4, the left image capture device 405 captures images of a portion of the user's face proximate to the to the left side 320E of the front rigid body 305 of the HMD 300 and including an eye of the user positioned at the exit pupil 420 of the HMD 300. Additionally, a right image capture device 410 is coupled to an interior surface of the right side 320D of the front rigid body of the HMD 300 and is proximate to the bottom side 320C of the front rigid body 305 of the HMD 300. The right image capture device 410 captures images of a portion of the user's face. In the example of FIG. 4, the right image capture device 410 captures images of a portion of the user's face proximate to the to the right side 320D of the front rigid body 305 of the HMD 300 and including an eye of the user positioned at the additional exit pupil 425 of the HMD 300.

In various embodiments, a left illumination source is positioned proximate to the left image capture device 405 and a right illumination source is positioned proximate to the right image capture device 410. The left illumination source emits light illuminating the portion of the user's face captured by the left image capture device 405, while the right illumination source emits light illuminating the additional portion of the user's face captured by the right image capture device 410. For example, the left illumination source and the right illumination source each comprise one or more light emitting diodes (LEDs), although any suitable device emitting light may be used as the left illumination source or the right illumination source. The left illumination source may be a ring of one or more LEDs arranged around a circumference of a lens of the left image capture device 405, or the right illumination source may be a ring of one or more LEDs arranged around a circumference of a lens of the right illumination source 410 in various embodiments. In various embodiments, the left illumination source and the right illumination source each emit infrared light to illumination the portion of the user's face and the additional portion of the user's face, respectively. However, in other embodiments, the left illumination source and the right illumination source emit any suitable wavelength or wavelengths of light to illuminate the portion and the additional portion of the user's face.

Additionally, the left illumination source is synchronized with the left image capture device 405, so the left illumination source illuminates the portion of the user's face when the left image capture device 405 is capturing an image, but does not illuminate the portion of the user's face when the left image capture device 405 is not capturing an image, in some embodiments. Similarly, the right illumination source is synchronized with the right image capture device 410, so the right illumination source illuminates the additional portion of the user's face when the right image capture device 410 is capturing an image, but does not illuminate the additional portion of the user's face when the right image capture device 410 is not capturing an image, in some embodiments. For example, the left image capture device 405 communicates a control signal to the left illumination source when the left image capture device 405 captures an image, causing the left illumination source to emit light while the left image capture device 405 captures the image; similarly, the right image capture device 410 communicates a control signal to the right illumination source when the right image capture device 410 captures an image, causing the right illumination source to emit light while the right image capture device 410 captures the image. Alternatively, the left illumination source, the right illumination source, or the left illumination source and the right illumination source illuminate the portion of the user's face or the additional portion of the user's face when the left image capture device 405 or the right image capture device 410 capture images and when the left image capture device 405 or the right image capture device 410 do not capture images.

The front rigid body 305 of the HMD 300 shown in FIG. 4 also includes a central image capture device 415 that is positioned within the front rigid body 305 between the exit pupil 420 and the additional exit pupil 425. The central image capture device 415 is configured to capture images of a central portion of the user's face that is enclosed by the front rigid body 305. In various embodiments, the central portion of the user's face includes a segment of the portion of the user's face as well as a segment of the additional portion of the user's face. In some embodiments, the central image capture device 415 is coupled to the eyecup assembly 435 or is embedded in the eyecup assembly 435. Alternatively, the central image capture device 415 is coupled to an interior surface of the front side 320A of the front rigid body 305. The left image capture device 405, the right image capture device 410, and the central image capture device 415 are examples of the additional image capture devices 215 of the facial tracking system 160.

A central illumination source is positioned proximate to the central image capture device 415 in various embodiments. For example, the central illumination source comprises one or more light emitting diodes positioned around a circumference of a lens of the central image capture device 415, although the central illumination source may have any suitable position in various embodiments. As described above, the central image capture device 415 provides a control signal to the central illumination source when the central image capture device 415 is capturing an image, causing the central illumination source to emit light while the central image capture device 415 is capturing an image, and provides an alternative control signal to the central illumination source when the central image capture device 415 stops capturing an image, causing the central illumination source to stop emitting light when the central image capture device 415 is not capturing an image. Alternatively, the central illumination source is configured to emit light both when the central image capture device 415 is capturing images and when the central image capture device 415 is not capturing images.

In the example of FIG. 4, an external image capture device 430 is coupled to the bottom side 320C of the front rigid body 305 of the HMD 300. The external image capture device 430 is configured to capture images of a portion of the user's face external to the front rigid body 305. For example, the external image capture device 430 is configured to capture images of a portion of the user's face external to the bottom side 320C of the front rigid body 305 (e.g., a mouth of the user). An external illumination source is positioned proximate to the external image capture device 430 in various embodiments. For example, the external illumination source comprises one or more light emitting diodes positioned around a circumference of a lens of the external image capture device 430, although the external illumination source may have any suitable position in various embodiments. As described above, the external image capture device 430 provides a control signal to the external illumination source when the external image capture device 430 is capturing an image, causing the external illumination source to emit light while the external image capture device 430 is capturing an image, and provides an alternative control signal to the external illumination source when the external image capture device 430 stops capturing an image, causing the external illumination source to stop emitting light when the external image capture device 430 is not capturing an image. Alternatively, the external illumination source is configured to emit light both when the external image capture device 430 is capturing images and when the external image capture device 430 is not capturing images. The external image capture device 430 is an example of an image capture device 210 of the facial tracking system 160.

Additionally, the controller 220 or the console 110 provides instructions to the left illumination source, the right illumination source, the central illumination source, and the external illumination source. Based on the instructions, the left illumination source, the right illumination source, the central illumination source, and the external illumination source modify emitted light.

In various embodiments, the left imaging device 405, the right imaging device 410, the central imaging device 415, and the external imaging device 430, each have a common field of view. For example, the left imaging device 405, the right imaging device 410, the central imaging device 415, and the external imaging device 430 each have a field of view of at least 105 degrees. In other embodiments, the left imaging device 405, the right imaging device 410, the central imaging device 415, and the external imaging device 430 have one or more different fields of view. For example, the left imaging device 405 and the right imaging device 410 have narrower fields of view than the central imaging device 415. As another example, the external imaging device 430 has a field of view that is wider than fields of view of the left image capture device 405, the right image capture device, and the central image capture device 415.

Figure 5:
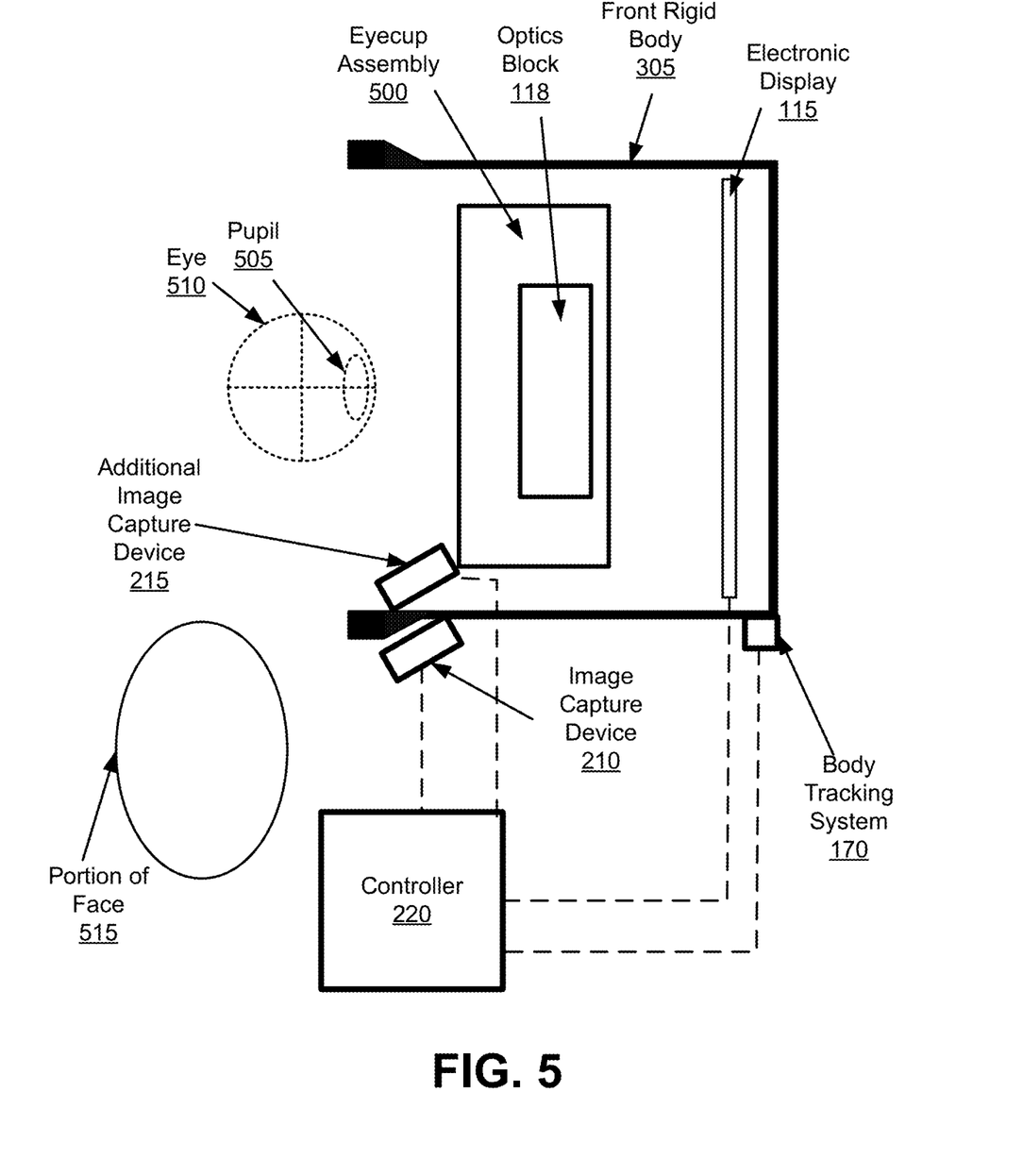
FIG. 5 is a cross section of the front rigid body of the head mounted display in FIG. 3, in accordance with an embodiment.

FIG. 5 is a cross-sectional diagram of an embodiment of the front rigid body 305 of the HMD 300 shown in FIG. 3. In the embodiment shown in FIG. 5, the front rigid body 305 includes an eyecup assembly 500, an image capture device 210, an additional image capture device 215, a controller 220, the body tracking system 170 an optics block 118, and an electronic display 115. The image capture device 210 is coupled to a bottom side of the front rigid body 305 in the example shown by FIG. 5 and positioned to capture images of a portion 415 of the user's face. For purposes of illustration, FIG. 5 shows a single image capture device 210; however, in various embodiments, any suitable number of image capture devices 210 may be coupled to the front rigid body 305 and positioned to capture images of the portion 515 of the user's face, as shown in the example of FIG. 4. For example, the image capture device 210 is proximate to a right side of the front rigid body 305, while another image capture device 210 is proximate to a left side of the front rigid body 305, as shown in the example of FIG. 4. While FIG. 5 shows the image capture device 210 coupled to an exterior surface of the front rigid body 305, in some embodiments the image capture device 210 is coupled to an interior surface of the front rigid body 305, which is transparent to or does not substantially attenuate wavelengths of light captured by the image capture device 210.

Additionally, in the example of FIG. 5, the HMD 300 includes an additional image capture device 215 within the front rigid body 305 and positioned to capture images of a portion of the user's face enclosed by the front rigid body 305. For purposes of illustration, FIG. 5 shows a single additional image capture device 215; however, in various embodiments, any suitable number of additional image capture devices 215 may be coupled to or included in an interior surface of the front rigid body 305 and positioned to capture images of one or more portions of the user's face enclosed by the front rigid body 305. For example, the additional image capture device 215 is proximate to a right side of an interior of the front rigid body 305, while another additional image capture device 215 is proximate to a left side of the interior of the front rigid body 305. While FIG. 5 shows the additional image capture device 215 coupled to an interior surface of the front rigid body 305, in some embodiments the additional image capture device 215 is included in the front rigid body 305, which is transparent to or does not substantially attenuate wavelengths of light captured by the additional image capture device 215. Example positioning of one or more additional image capture devices is further described above in conjunction with FIG. 4.

The body tracking system 170 includes multiple imaging devices configured to capture images of portions of the user's body. In the example shown by FIG. 5, the body tracking system 170 is positioned on a bottom side of the HMD 300, and imaging devices comprising the body tracking system 170 are positioned to capture images of portions of the user's body below the HMD 300. While FIG. 5 shows the body tracking system 170 coupled to an exterior surface of the front rigid body 305 of the HMD 300, in some embodiments the body tracking system 170 is included in the front rigid body 305, which is transparent to or does not substantially attenuate wavelengths of light captured by the imaging devices of the body tracking system 170. The body tracking system 170 is coupled to the controller 220, which generates graphical representations of portions of the user's body included in images captured by the body tracking system 170.

The front rigid body 305 includes an optical block 118 that magnifies image light from the electronic display 115, and in some embodiments, also corrects for one or more additional optical errors (e.g., distortion, astigmatism, etc.) in the image light from the electronic display 115. The optics block 118 directs the image light from the electronic display 115 to a pupil 505 of the user's eye 510 by directing the altered image light to an exit pupil of the front rigid body 305 that is a location where the user's eye 510 is positioned when the user wears the HMD 300. For purposes of illustration, FIG. 5 shows a cross section of the right side of the front rigid body 305 (from the perspective of the user) associated with a single eye 510, but another optical block, separate from the optical block 118, provides altered image light to another eye (i.e., a left eye) of the user.

The controller 220 is communicatively coupled to the electronic display 115, allowing the controller 220 to provide content for to the electronic display 115 for presentation to the user (e.g., a graphical representation of one or more portions 515 of the user's face based on data captured by the image capture device 210 or by the additional image capture device 215, a graphical representation of one or more portions of the user's body included in images captured by the body tracking system 170). Additionally or alternatively, the controller 220 is communicatively coupled to the console 110 and communicates a set of animation parameters for generating graphical representations of one or more portions 515 of the user's face or body to the console 110, which includes one or more graphical representations of portions 415 of the user's face or body in content provided to the electronic display 115, or generates content for presentation by the electronic display 115 based on the set of animation parameters received from the controller 220. Additionally, the controller 220 is communicatively coupled to the image capture device 210 and to the additional image capture device 215, allowing the controller 220 to provide instructions to the image capture device 210 and to the additional image capture device 215 for capturing images of the portion 415 of the user's face or for capturing images of an additional portion of the user's face, respectively. Similarly, the controller 220 is communicatively coupled to the body tracking system 170, allowing the controller 220 to provide instructions to the body tracking system 170 for capturing images of portions of the user's body.

Generating a Graphical Representation of a Face of a User Wearing a HMD

Figure 6:
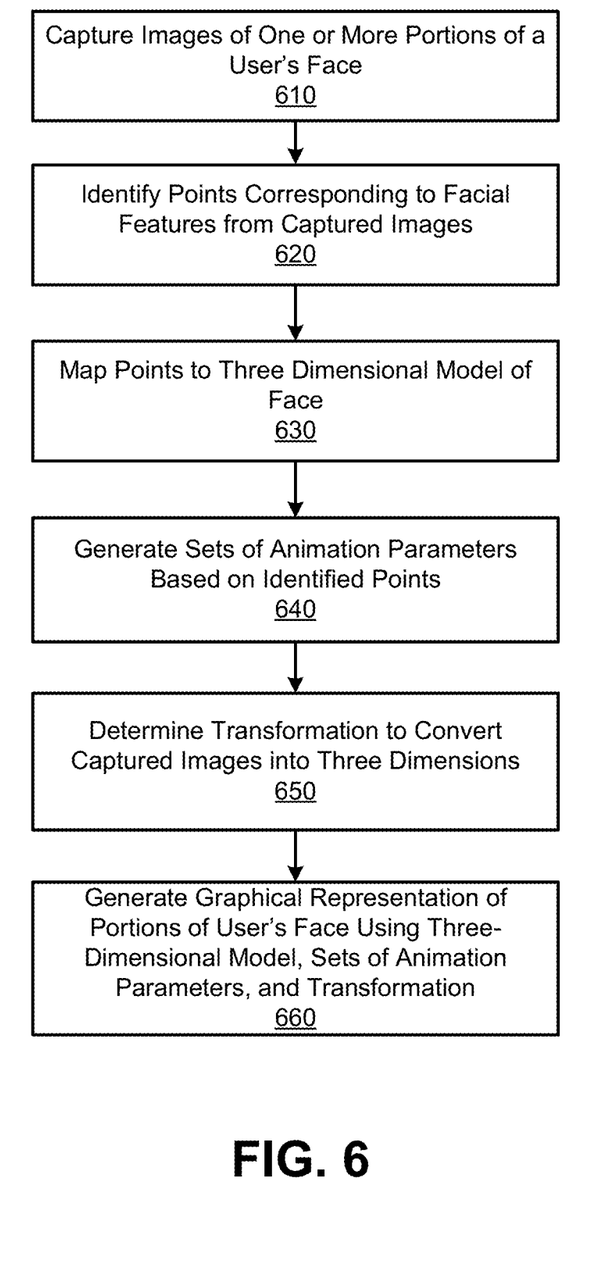
FIG. 6 is a flowchart of a method for generating a graphical representation of a user's face while the user wears a head mounted display, in accordance with an embodiment.

FIG. 6 is a flowchart of one embodiment of a method for generating a graphical representation of a user's face while the user wears a head mounted display (HMD) 105. The method described in conjunction with FIG. 6 may be performed by the facial tracking system 160, the console 110, or another system in various embodiments. Other entities perform some or all of the steps of the method in other embodiments. Embodiments of the process may include different or additional steps than those described in conjunction with FIG. 6. Additionally, in some embodiments, steps of the method may be performed in different orders than the order described in conjunction with FIG. 6.

One or more image capture devices 210 and additional image capture devices 215 coupled to a HMD 105 worn by a user capture 610 images of portions and additional portions, respectively, of the user's face. In various embodiments, multiple image capture devices 210 or additional image capture devices 215 are coupled to the HMD 105. Different image capture devices 210 have complementary fields of view with each other and with additional image capture devices 215; similarly, different additional image capture devices 215 also have complementary fields of view with each other and with image capture devices 210. Different image capture devices 210 capture 610 different portions of the user's face, and different additional image capture devices 215 capture 610 different additional portions of the user's face. FIG. 4 shows an example positioning of the image capture devices 215 and the additional image capture devices 215. An image capture device 210 captures 610 a series of images of a portion of the user's face within a field of view of the image capture device 210; similarly, an additional image capture device 215 captures 610 a series of images of an additional portion of the user's face within a field of view of the additional image capture device 215. In some embodiments, image capture devices 210 are positioned to capture 610 images of portions of the user's face below the HMD 105, while the additional image capture devices 215 are positioned to capture 510 images of portions of the user's face enclosed by the HMD 105.

The one or more image capture devices 210 and the one or more additional image capture devices 215 communicate the captured images to the controller 220, which identifies 620 points within captured images corresponding to features of portions of the user's face within each of the captured images. In various embodiments, features of a portion of the user's face correspond to boundaries of parts of the user's face. For example, points identified 520 within images captured 610 by the image capture devices 210 correspond to positions along boundaries of the user's lips or positions along the user's chin; in another example, points identified 620 within images captured 610 by the additional image capture devices 215 correspond to positions along boundaries of the user's eyes or along boundaries of portions of the user's eyes. As an example, points identified 620 within images captured 610 by the image capture devices 210 correspond to corners of the user's lips and various locations along boundaries of the user's lips, and points identified 620 within images captured 610 by the additional image capture devices 215 correspond to locations along a boundary of the user's eye, locations along a boundary of an iris of the user's eye, and locations along a boundary of a pupil of the user's eye.

To identify 620 points in images of a portion of the user's face, the controller 220 obtains a model trained by various additional users identifying points corresponding to features of each additional user in images of the additional users' faces while the additional users make different specific facial expressions. For example, an additional user makes specific facial expressions, and images of portions and additional portions of the user's face are captured by image capture devices 210 and additional image capture devices, respectively, when the additional user makes each specific facial expression. Subsequently, the additional user identifies various points in the captured images corresponding to each specific facial expression. For example, the additional user is presented with images of the portion of the additional user's face and of the additional portion of the additional user's face, and prompted to identify points within the images of the portions and of the additional portions of the additional user's face. Based on the points identified by the additional users when various specific facial expressions were made, a machine learned model is trained to identify 620 the points from the captured images. In various embodiments, different machine learned models are trained to identify 620 points on different portions of the user's face based on the points identified by different additional users when different specific facial expressions were made. In some embodiments, the console 110 receives the captured images of the additional users making the different specific facial expressions and the identification of different points on the additional users' faces and trains the machine learned model. In various embodiments, the machine learned model (or the different machine learned models) is trained via supervised descent; however, in other embodiments, any suitable method or methods may be used to train the machine learned model to identify 620 the points in images of portions or additional portions of the user's face. The controller 220 obtains the trained model and applies the trained model to images captured 610 by different image capture devices 210 and different additional image capture devices 215 to identify 620 points in images of portions of the user's face captured 610 by different image capture devices 210 and by different additional image capture devices 215. For example, the controller 220 identifies 620 points of portions of the user's face included in each image captured 610 by each image capture device 210 and by each additional image capture device 215.

The controller 220 maps 630 the identified points to a three-dimensional model of a face. In some embodiments, the three-dimensional model of the face is selected from a stored library of three-dimensional models based on characteristics of the user. For example, the user specifies one or more parameters and the controller 220 selects a three-dimensional model of a face from the library that has at least a threshold amount of parameters matching the parameters specified by the user; the controller 220 identifies points on the selected three-dimensional model corresponding to the points identified 620 from the captured images to map 630 the identified points to the selected three-dimensional model. Alternatively, the controller 220 receives an image of the user's face and selects a three-dimensional model of a face having at least a threshold similarity to the image of the user's face and maps 630 the identified points to the selected three-dimensional model by identifying points on the selected three-dimensional model corresponding to the points identified 620 from the captured images.

From the points identified in images captured 610 by one or more image capture devices 210, the controller 220 generates 640 a set of animation parameters for each portions of the user's face of which the image capture devices 210 or the additional image capture devices 215 captured 610 images. In various embodiments, the set of animation parameters is a vector of blendshape coefficients specifying weights associated with different blendshapes that correspond to different specific facial expressions. Hence, the set of animation parameters specifies a blendshape model describing the user's facial expressions as a linear combination of blendshapes each weighted by a coefficient and that each correspond to a facial expression of the portion of the user's face included in a captured image. Hence, a vector of blendshape coefficients is determined for each image captured 610 by an image capture device 210 or by an additional image capture device 215. Coefficients associated with different blendshapes may be determined by the controller 220 based on positions of the identified points within various captured images, so the positions of the identified points within captured images determine weights corresponding to various facial expressions in the vector of blendshape coefficients. However, weights for various expressions of portions and additional portions of the user's face may be determined from the identified points within the captured images using any suitable method in various embodiments.

In various embodiments, the controller 220 accounts for optical flow of the identified points within images captured 610 by various image capture devices 210 and of the identified points within images captured 610 by various additional image capture devices 215 when generating 640 the set of animation parameters. For example, based on movement of identified points within different images captured by the image capture devices 210, the controller 220 determines a regularization parameter applied to sets of animation parameters generated for the different images to provide more fluid transitions between facial expressions captured in different images. Similarly, based on movement of identified points within different images captured by the additional image capture devices 215, the controller 220 determines an additional regularization parameter applied to sets of animation parameters generated for the different images to provide more fluid transitions between facial expressions captured in different images. Hence, the controller 220 may determine regularization parameters for animation parameters generated 640 from images captured 610 by the image capture devices 210 and additional regularization parameters for animation parameters generated 640 from images captured 610 by the additional image capture devices 215. Determining regularization parameters for different portions of the user's face captured by the image capture devices 210 or captured by the additional image capture devices 215 allows the generated 640 set of animation parameters to more smoothly represent changes in portions of the user's face between different images captured 610 by the image capture devices 210 or by the additional image capture devices 215.

The controller 220 may account for information from other types of sensors when generating 640 the set of animation parameters. Example other types of sensors include: an audio sensor, a strain gauge, an electric sensor, a magnetic sensor, a proximity sensor, or any other sensor capturing non-optical data. As another example, surface electrodes are coupled to the controller 220 and to portions of the user's face, and electrical conductivity, permittivity, or impedance is inferred from measurements at the electrode to form tomographic images of portions of the user's face that the controller 220 uses along with the captured images to generate 540 the set of animation parameters. Additionally, the HMD 105 includes an electroencephalograph sensor configured to capture the user's brain activity, which is provided to the controller 220 for use along with the captured images when generating 640 the set of animation parameters.

In some embodiments, one or more audio capture devices are coupled to the HMD 105 or included in the HMD 105 and capture audio data from the user. The audio capture devices are coupled to the controller 220, which accounts for captured audio signals when generating 540 the set of animation parameters. In some embodiments, the controller 220 includes an audio prediction model trained on facial movements captured from various users when different audio signals were captured from the user; hence, the audio prediction model may determine estimated positions of points of portions of the user's face when different audio signals are received by the audio capture devices. The controller 220 may adjust one or more of the animation parameters based on the audio prediction model to more accurately determine positions of portions of the user's face when the user is speaking.

Additionally, the controller 220 determines 650 transformations mapping the two-dimensional images captured 610 by each image capture device 210 and additional image capture device 210 into three dimensions. Any suitable method may be used by the controller to determine 640 transformations mapping images captured 610 by the image capture devices 210 and by the additional image capture devices 215 to three dimensions in various embodiments. In some embodiments, the controller 220 also determines differential transformations between pairs of image capture devices 210 that account for movement of the image capture devices 210 in one or more dimensions. For example, a differential transformation accounts for movement of image capture devices 210 in a horizontal direction, while another differential transformation accounts for movement of image capture devices 210 in a vertical direction. The controller 220 also determines differential transformations between pairs of additional image capture devices 215 that account for movement of the additional image capture devices 215 in one or more dimensions. For example, a differential transformation accounts for movement of additional image capture devices 215 in a horizontal direction, while another differential transformation accounts for movement of additional image capture devices 215 in a vertical direction. In some embodiments, the controller 220 determines six differential transformations between pairs of image capture devices 210 and pairs of additional image capture devices 215 to account for movement of the image capture devices 210 or of the additional image capture devices 215 in six directions. In various embodiments, each differential transformation attenuates movement in a direction based on an expected variance of movement in the direction; for example, a differential transformation attenuates movement in a vertical direction less than attenuation of movement in a horizontal direction by another differential transformation, as movement of the image capture devices 210 or of the additional image capture devices 215 in the vertical direction is more likely. Hence, the differential transformations compensate for movement of the image capture devices 210 and of the additional image capture devices 215 while the user is wearing the HMD 105.

In some embodiments, a differential transformation differently attenuates various weights associated with blendshapes. For example, for weights between a minimum value and a threshold value, the differential transform applies a quadratic penalty to the weights to reduce sparseness between facial expressions corresponding to different blendshapes. However, in the preceding example, the differential transform applies a linear penalty to weights between the threshold value and an additional threshold, which prevents attenuation by the differential transformation from attenuating the weights so differences between facial expressions corresponding to different blendshapes are reduced, resulting in an overly muted graphical representation of facial expressions of the user.

Based on the transformations, sets of animation parameters, and differential transformations, the controller 220 generates 660 a rendering model that is applied to the three dimensional model of the face to reposition the points of the three-dimensional model mapped to the identified points within images captured by the image capture devices 210 and by the additional image capture devices 215 to generate a graphical representation of the user's face where the portions of the graphical representation of the user's face corresponding to the portions of the user's face captured 610 by the image capture devices 210 and by the additional image capture devices 215 have expressions matching expressions of the portions of the user's face in images captured 610 by the image capture devices 210 and by the additional image capture devices 215. Hence, as expressions of the portions of the user's face change while the user is wearing the HMD 105, the transformations, sets of animation parameters, and differential transformations alter corresponding portions of the three dimensional model of the face based on points identified 620 from images captured 610 by the image capture devices 210 and by the additional image capture devices 215. In various embodiments, the controller 220 provides the transformations, sets of animation parameters, and differential transformations to the console 110 in association with information identifying the user, allowing the console 110 to store the transformations, sets of animation parameters, and differential transformations in association with the user or to communicate the transformations, sets of animation parameters, and differential transformations along with information identifying the user to other consoles 110 or other HMDs 105. The controller 220 may alternatively or additionally provide the transformations, sets of animation parameters, and differential transformations and information identifying the user to controllers 220 coupled to other HMDs 105, allowing the other HMDs 105 to render the graphical representation of the user's face and alter portions of the graphical representation of the user's face as the image capture devices 210 on the HMD 105 identify changes to the portions of the user's face captured by the image capture devices 210 or by the additional image capture devices 215.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head mounted display (HMD) comprising:
a rigid body having a front side, a left side, a right side, a top side, and a bottom side and including a display element configured to display content to a user wearing the HMD and an optics block configured to direct light from the display element to an exit pupil and an additional exit pupil of the HMD;
a left image capture device coupled to an interior surface of the left side of the front rigid body and proximate to the bottom side of the rigid body, the left image capture device configured to capture images of a portion of the user's face enclosed by the rigid body;
an right image capture device coupled to an interior surface of the right side of the front rigid body and proximate to the bottom side of the rigid body, the right image capture device configured to capture images of an additional portion of the user's face enclosed by the rigid body; and
a central image capture device positioned within the rigid body between the exit pupil and the additional exit pupil, the central image capture device configured to capture images of a central portion of the user's face enclosed by the rigid body.

2. The HMD of claim 1, further comprising:
a left illumination source positioned proximate to the left image capture device and configured to emit light illuminating the portion of the user's face.

3. The HMD of claim 2, wherein the left illumination source is configured to emit light while the left image capture device captures an image of the portion of the user's face and to not emit light when the left image capture device is not capturing the image of the portion of the user's face.

4. The HMD of claim 2, further comprising:
a right illumination source positioned proximate to the right image capture device and configured to emit light illuminating the additional portion of the user's face.

5. The HMD of claim 4, wherein the right illumination source is configured to emit light while the right image capture device captures an image of the additional portion of the user's face and to not emit light when the right image capture device is not capturing the image of the additional portion of the user's face.

6. The HMD of claim 4, further comprising:
a central illumination source positioned proximate to the central image capture device and configured to emit light illuminating the central portion of the user's face.

7. The HMD of claim 6, wherein the central illumination source is configured to emit light while the central image capture device captures an image of the central portion of the user's face and to not emit light when the central image capture device is not capturing the image of the central portion of the user's face.

8. The HMD of claim 1, wherein the left image capture device, the right image capture device, and the central image capture device have complementary fields of view.

9. The HMD of claim 1, further comprising:
an external image capture device coupled to the bottom side of the front rigid body and configured to capture images of a portion of the user's face external to the bottom surface of the front rigid body.

10. The HMD of claim 9, further comprising:
an external illumination source positioned proximate to the external image capture device and configured to emit light illuminating the portion of the user's face external to the bottom surface of the front rigid body.

11. A system comprising:
a head mounted display (HMD) comprising:
a rigid body having a front side, a left side, a right side, a top side, and a bottom side and including a display element configured to display content to a user wearing the HMD and an optics block configured to direct light from the display element to an exit pupil and an additional exit pupil of the HMD;
a left image capture device coupled to an interior surface of the left side of the front rigid body and proximate to the bottom side of the rigid body, the left image capture device configured to capture images of a portion of the user's face enclosed by the rigid body;
an right image capture device coupled to an interior surface of the right side of the front rigid body and proximate to the bottom side of the rigid body, the right image capture device configured to capture images of an additional portion of the user's face enclosed by the rigid body;
a central image capture device positioned within the rigid body between the exit pupil and the additional exit pupil, the central image capture device configured to capture images of a central portion of the user's face enclosed by the rigid body; and
a controller coupled to the left image capture device, to the right image capture device, and to the central image capture device, the controller configured to generate a graphical representation of the user's face based on the images of the portion of the user's face, the images of the additional portion of the user's face, and the images of the central portion of the user's face; and
a console coupled to the HMD, the console configured to provide content to the HMD for presentation by an electronic display included in the HMD and to receive the graphical representation of the user's face from the controller.

12. The system of claim 11, wherein the HMD further comprises:
a left illumination source positioned proximate to the left image capture device and configured to emit light illuminating the portion of the user's face.

13. The system of claim 12, wherein the left illumination source is configured to emit light while the left image capture device captures an image of the portion of the user's face and to not emit light when the left image capture device is not capturing the image of the portion of the user's face.

14. The system of claim 12, wherein the HMD further comprises:
a right illumination source positioned proximate to the right image capture device and configured to emit light illuminating the additional portion of the user's face.

15. The system of claim 14, wherein the right illumination source is configured to emit light while the right image capture device captures an image of the additional portion of the user's face and to not emit light when the right image capture device is not capturing the image of the additional portion of the user's face.

16. The system of claim 14, wherein the HMD further comprises:
a central illumination source positioned proximate to the central image capture device and configured to emit light illuminating the central portion of the user's face.

17. The system of claim 16, wherein the central illumination source is configured to emit light while the central image capture device captures an image of the central portion of the user's face and to not emit light when the central image capture device is not capturing the image of the central portion of the user's face.

18. The system of claim 11, wherein the left image capture device, the right image capture device, and the central image capture device have complementary fields of view.

19. The system of claim 11, wherein the HMD further comprises:
an external image capture device coupled to the bottom side of the front rigid body and configured to capture images of a portion of the user's face external to the bottom surface of the front rigid body.

20. The system of claim 19, wherein the HMD further comprises:
an external illumination source positioned proximate to the external image capture device and configured to emit light illuminating the portion of the user's face external to the bottom surface of the front rigid body.

* * * * *

UNITED STATES PATENT AND TRADEMARK OFFICE
CERTIFICATE OF CORRECTION

PATENT NO. : 10,495,882 B1
APPLICATION NO. : 15/997655
DATED : December 3, 2019
INVENTOR(S) : Hernan Badino et al.

It is certified that error appears in the above-identified patent and that said Letters Patent is hereby corrected as shown below:

In the Claims

Column 20, Claim 1, Line 51, delete "an right image capture device" and insert -- a right image capture device --.

Column 21, Claim 11, Line 51, delete "an right image capture device" and insert -- a right image capture device --.

Signed and Sealed this
Twenty-first Day of July, 2020

Andrei Iancu
*Director of the United States Patent and Trademark Office*